United States Patent Office 3,709,996
Patented Jan. 9, 1973

3,709,996
PHARMACEUTICAL COMPOSITIONS CONTAINING N-CYCLOPROPYL-1-AMINOINDANE COMPOUNDS AND ADAPTED FOR ADMINISTRATION TO OBTAIN INHIBITION OF MONOAMINE OXIDASE ENZYME AND PROCESS
Maurice Ward Gittos, Slough, John William James, Langley, and Leslie Frederick Wiggins, Wargrave, England, assignors to Aspro-Nicholas Limited, London, England
No Drawing. Continuation-in-part of application Ser. No. 623,470, Mar. 15, 1967, which is a continuation of application Ser. No. 385,761, July 28, 1964, now abandoned, and a continuation-in-part of application Ser. No. 855,794, Aug. 18, 1969, now Patent No. 3,534,005, which in turn is a continuation of application Ser. No. 652,029, July 10, 1967, now abandoned. This application Dec. 5, 1969, Ser. No. 882,730
Claims priority, application Great Britain, Aug. 2, 1963, 30,832/63; July 16, 1966, 32,067/66
Int. Cl. A61k 27/00
U.S. Cl. 424—330                 11 Claims

ABSTRACT OF THE DISCLOSURE

N-cyclopropyl-1-aminoindane compounds are provided which act as inhibitors of monoamine oxidase in the animal body and also have adrenolytic activity. A process of inhibiting the action of monoamine oxidase enzyme is also provided, in which such compounds are administered, and pharmaceutical compositions in dosage unit form containing such compounds are provided for this purpose.

---

This application is a continuation-in-part of Ser. No. 623,470 filed Mar. 15, 1967, which in turn is a continuation of Ser. No. 385,761 filed July 28, 1964 and now abandoned, and also a continuation-in-part of Ser. No. 855,794 filed Aug. 18, 1969 now U.S. Pat. 3,534,005, patented Oct. 13, 1970, which in turn is a continuation of Ser. No. 652,029 filed July 10, 1967, now abandoned.

This invention relates to N-substituted 1-aminoindane derivatives, to processes for preparing the same and to pharmaceutical compositions containing the same.

It has been found in accordance with the invention that certain N-substituted 1-aminoindane derivatives act as inhibitors of monoamine oxidase in the animal body and also have adrenolytic activity. They may therefore be of benefit as anti-depressant or psychostimulant agents and also in the treatment of diseases of the cardiovascular system.

These aminoindane derivatives are the 1-aminoindane derivatives represented by the general formula:

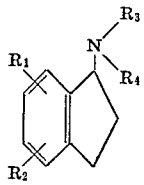

and the pharmaceutically acceptable salts thereof, wherein $R_1$ and $R_2$, which may be the same or different, are hydrogen, methyl, ethyl, halogen, for example, chlorine, bromine and fluorine, hydroxy or lower alkoxy; $R_3$ is hydrogen or lower alkyl; and $R_4$ is cyclopropyl.

The terms "lower alkyl" and "lower alkoxy" are used in this specification as meaning respectively alkyl and alkoxy groups containing from 1 to 4 carbon atoms, for example, methyl, ethyl, propyl, isopropyl, butyl, t.-butyl, methoxy, ethoxy, isopropoxy, butoxy, s.-butoxy and t.-butoxy.

Within the group of compounds encompassed by Formula I, there is a pharmaceutically preferred group of compounds in which $R_3$ is hydrogen, methyl or ethyl and $R_1$ and/or $R_2$ are hydrogen or lower alkoxy, preferably methoxy.

Exemplary of compounds of this invention are:

N-cyclopropyl-1-aminoindane
N-methyl-N-cyclopropyl-1-aminoindane
N-isopropyl-N-cyclopropyl-1-aminoindane
N-ethyl-N-cyclopropyl-1-aminoindane
N-t.butyl-N-cyclopropyl-1-aminoindane
N-cyclopropyl-5-methoxy-1-aminodane
N-cyclopropyl-6-methoxy-1-aminoindane
N-cyclopropyl-5,6-dimethoxy-1-aminoindane
N-cyclopropyl-6-methyl-1-aminoindane
N-cyclopropyl-7-ethyl-1-aminoindane
N-ethyl-N-cyclopropyl-6,7-dimethyl-1-aminoindane
N-methyl-N-cyclopropyl-5-hydroxy-1-aminoindane
N-cyclopropyl-6-hydroxy-1-aminoindane
N-cyclopropyl-5-chloro-1-aminoindane
N-cyclopropyl-5,6-dibromo-1-aminoindane
N-cyclopropyl-7-fluoro-1-aminoindane
N-butyl-N-cyclopropyl-5-chloro-7-methoxy-1-aminoindane
N-cyclopropyl-4-methyl-6-bromo-1-aminoindane
N-cyclopropyl-6-s.butoxy-1-aminoindane
N-propyl-N-cyclopropyl-5-propoxy-1-aminoindane The compounds of the invention may be prepared according to standard methods. For example, when $R_3$ in Formula I is hydrogen, the compounds can be prepared either (a) by reacting a 1-indanone of the general formula:

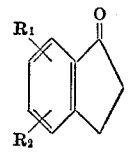

wherein $R_1$ and $R_2$ have the same meanings as in Formula I with either (a) an N-substituted formamide of the general formula:

$$HCONHR_4 \qquad IV$$

wherein $R_4$ has the same meaning as in Formula I, and submitting the resulting 1-indane formamide to an acid or alkaline hydrolysis to form the desired compound, or (ii) an amine or Formula VI, wherein $R_4$ is as defined in Formula I, in a suitable solvent such as benzene and either simultaneously or thereafter reducing the resultant 1-aminoindene with a reducing agent such as palladium on charcoal or palladium on barium sulphate to form the desired compound.

or (b) by condensing a 1-haloindane of the general formula:

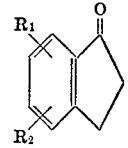

wherein X is a halogen, preferably chlorine, and $R_1$ and $R_2$ have the same meanings as in Formula I, with an amine of the general formula:

$$R_4-NH_2 \qquad VI$$

wherein $R_4$ has the same meaning as in Formula I, advantageously using either an excess of the amine (Formula VI) or an organic base, for example pyridine, as a proton acceptor.

The 1-indanones of Formula III may conveniently be prepared from the corresponding cinnamic acid by catalytic reduction and cyclising the resulting hydrocinnamic acid with thionyl chloride and aluminium chloride as described in "Organic Reactions," vol. II, page 114.

When $R_3$ in Formula I is lower alkyl, the compounds of the invention can be prepared by alkylation of the corresponding compound of Formula I in which $R_3$ is hydrogen, using an appropriate alkylating agent. The alkylation may be carried out with, for example, a lower alkyl bromide, iodide, sulphate, benzenesulphonate or p-toluenesulphonate.

Alternatively the compounds of Formula I in which $R_3$ is lower alkyl may be prepared (a) by reacting a 1-indanone of Formula III with an N-substituted formamide of the general formula:

$$HCONHR_3 \qquad VII$$

wherein $R_3$ is lower alkyl, and submitting the resulting 1-indane formamide to acid or alkaline hydrolysis, or (b) by condensing a 1-haloindane of Formula V with an amine of the general formula:

$$R_3-NH_2 \qquad VIII$$

wherein $R_3$ is lower alkyl, whereby there is obtained an N-monosubstituted 1-aminoindane of the general formula:

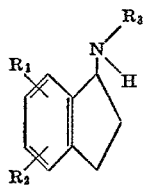

IX wherein $R_1$, $R_2$ and $R_3$ have the same meanings as in Formula I, which is thereafter treated with a halogen compound of the general formula:

$$X-R_4 \qquad X$$

wherein $R_4$ has the same meaning as in Formula I and X is halogen, preferably chlorine or bromine, preferably in an inert solvent such as, for example, ether, benzene, toluene, or dioxan, and in the presence of a proton acceptor, to give the desired compound. The proton acceptor may be an excess of the aminoindane of Formula IX or an inorganic base such as, for example an alkali metal, an alkali-metal amide or an alkali-metal hydride. The foregoing alternative method of preparing compounds of Formula I in which $R_3$ is lower alkyl is less suitable than the other methods described above for the preparation of the compounds of the invention, in view of the relatively poor reactivity of the cyclopropyl halides of Formula X.

Salts of the compounds of Formula I are acid addition salts. Acid addition salts comprise pharmaceutically acceptable, non-toxic addition salts with suitable acids, such as those with inorganic acids, for example hydrochloric, hydrobromic, nitric, sulphuric or phosphoric acids, or with organic acids, such as organic carboxylic acids, for example acetic, glycollic, maleic, tartaric, citric, o-acetyloxybenzoic, nicotinic or isonicotinic acid, or organic sulphonic acids, for example methane sulphonic, ethane sulphonic, 2-hydroxyethane sulphonic, p-toluene sulphonic or naphthalene 2-sulphonic acid.

A resulting acid addition salt may be converted into the free compound according to known methods, for example, by treating it with a base such as with a metal hydroxide, for example an alkali metal or alkaline earth metal hydroxide, for example lithium hydroxide, sodium hydroxide, potassium hydroxide or calcium hydroxide; a metal carbonate such as an alkali metal or an alkaline earth metal carbonate or hydrogen carbonate, for example sodium, potassium or calcium carbonate or hydrogen carbonate; ammonia; with a hydroxyl ion exchange preparation, or with any other suitable reagent.

A resulting acid addition salt may also be converted into another acid addition salt according to known methods; for example, a salt with an inorganic acid may be treated with a metal salt, for example sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

As previously mentioned, the compounds of Formula I have been found to have activity as monoamine oxidase inhibitors and accordingly one aspect of the present invention provides a method of inhibiting in the animal body the action of monoamine oxidase enzyme, which comprises administering in a sufficient non-toxic dose a compound of Formula I or a pharmaceutically acceptable acid addition salt thereof.

It will be appreciated that for medicinal use, the compounds of the invention can be made up, in accordance with pharmaceutical techniques well known per se, into pharmaceutical compositions comprising as an essential active ingredient an aminoindane derivative of Formula I or a pharmaceutically acceptable acid addition salt thereof and a pharmaceutical carrier for the active ingredient. The pharmaceutical carrier may be an orally ingestible container for the active ingredient, for example a hard or soft gelatin capsule, or the carrier may be a pharmaceutical diluent or excipient which is in admixture with the active ingredient, for example starch, lactose, mannitol, sorbitol, calcium phosphate, talc, magnesium stearate, stearic acid, ethylcellulose, oil of theobroma, glycerin, or water, or a preservative such as for example methyl p-hydroxybenzoate or propyl p-hydroxybenzoate. The composition may be in a form suitable for oral, parenteral or rectal administration and may therefore take the form of, for example a sterile solution or suspension in water or other liquids for parenteral administration or a suppository for rectal administration. However, for clinical practice the compound of the invention will preferably be administered by the oral route and hence the preferred compositions will be made up in a form suitable for oral ingestion, for example solutions, suspensions, emulsions, elixers, syrups, powders or tablets.

For clinical use, the compositions are advantageously made up in a dosage unit form adapted for the desired mode of administration. Thus for oral administration, the dosage unit may take the form of, for example, a tablet, pill, sachet, cachet, packaged powder or a hard or soft gelatin capsule which may enclose a liquid, semi-liquid or solid composition or the pure active ingredient. For administration by injection, the dosage unit may take the form of a container such as an ampoule containing either an injectable solution or a composition from which such a solution may be prepared. The quantity of active ingredient in each dosage unit will be such that one or more and conveniently no more than 2 or 3 units are required for each therapeutic administration. For example, the dosage unit may contain from 10 to 100, advantageously 25 to 60, mg. of the active ingredient. The dosage units may be administered from two to four times daily depending on the condition of the patient.

The following examples illustrate the preparation of compounds and compositions in accordance with the invention.

EXAMPLE 1

A mixture of 1-chloroindane (13.42 g.; 088 mole) and cyclopropylamine (10 g.; 0.176 mole) was heated on a steam bath for 4½ hours, during which time two layers formed, the lower one solidifying on cooling. Petroleum ether, B.P. 40–60° C. (100 ml.) was added, the solid cyclopropylamine hydrochloride filtered off, and the petroleum ether evaporated off from the filtrate. The resulting residue was dissolved in ether (30 ml.) and then extracted with dilute hydrochloric acid (5 N). At this stage a white crystalline precipitate was formed which was filtered off and recrystallised from isopropanol to obtain N-cyclopropyl-1-aminoindane hydrochloride, M.P. 189–190° C. (4.8 g.). The separated acid layer was made alkaline with 5 N sodium hydroxide and the basic oil ether extracted. Addition of ethereal hydrogen chloride to the dried ether extract precipitated N-cyclopropyl-1-aminoindane hydrochloride as colourless crystals, M.P. 181–182° C. after recrystallisation from isopropanol (2.8 g.). Total yield 7.6 g.

Found (percent): C, 69.02; H, 7.76; N, 6.7; Cl. 17.2. $C_{12}H_{15}NHCl$ requires (percent): C, 68.73; H, 7.69; N, 6.68; Cl, 16.90.

EXAMPLE 2

Tablets each having the following composition were prepared as described below:

|                                              | Mg. |
|----------------------------------------------|-----|
| N-cyclopropyl-1-aminoindane hydrochloride    | 50  |
| Lactose                                      | 248 |
| Maize starch (dried)                         | 70  |
| Ethylcellulose N.100*                        | 8   |
| Talc                                         | 20  |
| Magnesium stearate                           | 4   |

*Ethylcellulose N.100 is a commercially available ethoxylated cellulose having an ethoxyl content of 47.5 to 49.0%. A 5% w./w. solution in 80 parts toluene/20 parts ethanol has a viscosity of 80 to 105 cp. at 25° C.

The N-cyclopropyl-1-aminoindane hydrochloride, lactose and a proportion of the starch (40 mg./tablet) were passed through a No. 44 (B.S.S.) mesh sieve and mixed together. The mixed powders were massed with a 5% w./w. solution of ethylcellulose in isopropyl alcohol and the mass granulated through a No. 12 (B.S.S.) mesh sieve. The granules were dried at 40° C. and then passed through a No. 16 (B.S.S.) mesh sieve. Finally the talc, magnesium stearate and the balance of the starch (all passed through a No. 60 (B.S.S.) mesh sieve) were added to the granules and the mixture compressed into tablets each weighing 400 mg.

EXAMPLE 3

Capsules each having the following compositions were made up as described below:

|                                              | Mg. |
|----------------------------------------------|-----|
| N-cyclopropyl-1-aminoindane hydrochloride    | 50  |
| Lactose                                      | 80  |

The N-cyclopropyl-1-aminoindane hydrochloride and lactose were passed through a No. 44 (B.S.S.) mesh sieve and well mixed together. The mixed powders were filled into hard gelatin capsules of suitable size so that each contained 130 mg. of the mixed powder.

EXAMPLE 4

Suppositiories each having the following composition were made up as described below:

| N-cyclopropyl-1-aminoindane hydrochloride | mg | 50 |
| Oil of theobroma | g | 0.975 |

The N-cyclopropyl-1-aminoindane hydrochloride was passed through a No. 60 (B.S.S.) mesh sieve and triturated with the molten oil of theobroma at 45° C. to form a smooth suspension. The mixture was stirred well and poured into moulds each of nominal 1 g. capacity to produce suppositories. Each suppository contained 50 mg. of N-cyclopropyl-1-aminoindane hydrochloride.

EXAMPLE 5

Injection solutions of N-cyclopropyl-1-aminoindane hydrochloride were prepared as described below:

(i) The N-cyclopropyl-1-aminoindane hydrochloride was dissolved in normal saline for injection so that the resultant solution contained 2 mg./ml. This solution was then filtered through a bacteria proof filter and transferred aseptically to the final sterile containers.

(ii) The N-cyclopropyl-1-aminoindane hydrochloride was dissolved in normal saline for injection so that the resultant solution contained 10 mg./ml. This solution was filtered through a bacteria proof filter and transferred aseptically to the final sterile containers.

(iii) The N-cyclopropyl-1-aminoindane hydrochloride was dissolved in normal saline solution for injection so that the resultant solution contained 50 mg./ml. This solution was then filtered through a bacteria proof filter and transferred aseptically to the final sterile containers.

EXAMPLE 6

A syrup containing N-cyclopropyl-1-aminoindane hydrochloride was prepared as described below:

| N-cyclopropyl-1-aminoindane hydrochloride | g | 10.0 |
| Glycerin | ml | 50.0 |
| Liquid invert sugar | ml | 500.0 |
| Methyl-p-hydroxybenzoate | g | 1.0 |
| Propyl-p-hydroxybenzoate | g | 0.4 |
| Propylene glycol | ml. | 10.0 |
| Distilled water q.s. to 1.0 litre. | | |

The N-cyclopropyl-1-aminoindane hydrochloride was dissolved in 300 ml. of distilled water and the liquid invert sugar added to this solution.

Both the methyl and propyl p-hydroxybenzoates were dissolved in the propylene glycol with the aid of heat and the resultant solution diluted with the glycerin. This solution was then added to the prepared solution of N-cyclopropyl-1-aminoindane hydrochloride and further distilled water added to give a final volume of 1 litre.

Each 5 ml. of the prepared syrup contains 50 mg. of the active ingredient.

It will be appreciated that in the composition Examples 2 to 6, the active compound specified may be replaced by other compounds of the invention having the necessary pharmacological activity, and that other pharmaceutically acceptable salts may be employed in place of the hydrochloride salts.

EXAMPLE 7

A mixture of N-cyclopropyl-1-aminoindane (8.65 g.; 0.05 mole), ethyl iodide (4 g.; 0.025 mole) and methyl cyanide was refluxed for 12 hours. The methyl cyanide was evaporated off under reduced pressure and the residue warmed with anhydrous ether. The solid remaining undissolved was filtered off and the filtrate distilled to give N-ethyl-N-cyclopropyl-1-aminoindane, B.P. 62–65° C./ 0.1 mm.

EXAMPLE 8

By the same method as described in Example 7, N-methyl-N-cyclopropyl-1-aminoindane, B.P. 70–4° C./0.2 mm. was prepared.

EXAMPLE 9

By reacting N-cyclopropyl-1-aminoindane with t.butyl bromide in the manner described in Example 7, N-t.butyl-N-cyclopropyl-1-aminoindane was prepared.

EXAMPLE 10

By reacting 1-chloro-6-hydroxyindane and cyclopropylamine in the manner described in Example 1, N-cyclopropyl-6-hydroxy-1-aminoindane was prepared.

EXAMPLE 11

By reacting 1-chloro-7-ethylindane and cyclopropylamine in the manner described in Example 1, N-cyclopropyl-7-ethyl-1-aminoindane was prepared.

EXAMPLE 12

A mixture of 5-methoxy-1-indanone (6.1 g.; 0.038 mole), cyclopropylamine (2.17 g., 0.038 mole), cyclopropylamine p-toluene sulphonate (0.05 g.), absolute ethanol (110 ml.), glacial acetic acid (2 ml.) and 5% palladium on barium sulphate (1 g.) was reacted at room temperature and atmospheric pressure. The warmed mixture was filtered, acidified with dilute hydrochloric acid, the ethanol evaporated off and the residue dissolved in water. The solution was extracted with ether, the aqueous layer separated and basified with dilute sodium hydroxide. The oily layer was isolated by ether extraction. Distillation of the ether extract yielded N-cyclopropyl-5-methoxy-1-aminoindane, B.P. 102–106° C./0.3 mm. The base was converted to its hydrochloride by treatment with ethereal hydrogen chloride. After crystallisation from methanol it had an M.P. 172–173° C.

EXAMPLE 13

A mixture of 5,6-dimethoxy-1-indanone (19 g.; 0.099 mole), cyclopropylamine (6.7 g.; 0.1 mole), cyclopropylamine p-toluenesulphonate (0.1 g.), absolute ethanol (150 ml.), glacial acetic acid (6 ml.) and 5% palladium on barium sulphate (2 g.) was reacted at room temperature and atmospheric pressure. The mixture was then worked up as in Example 12 to give N-cyclopropyl-5,6-dimethoxy-1-aminoindane, B.P. 186–190° C./15 mm. Treatment of the base with ethereal hydrogen chloride and crystallisation of the solid from ethanol gave N-cyclopropyl-5,6-dimethoxy-1-aminoindane hydrochloride, M.P. 193° C.

EXAMPLE 14

By reacting 4-methyl-6-bromo-1-indanone with cyclopropylamine in the manner described in Example 12, N-cyclopropyl - 4 - methyl - 6 - bromo - 1 - aminoindane was obtained.

EXAMPLE 15

By reacting 6,7-dimethyl-1-indanone with cyclopropylamine in the manner described in Example 12, N-cyclopropyl-6,7-dimethyl-1-aminoindane was prepared. On reacting this compound with ethyl iodide by the method of Example 7, N-ethyl-N-cyclopropyl-6,7-dimethyl-1-aminoindane was obtained.

EXAMPLE 16

By the method of Example 15 but using 5-propoxy-1-indanone, cyclopropylamine and propyl iodide, N-cyclopropyl- and N-propyl-N-cyclopropyl-5-propoxy-1-aminoindane were prepared.

EXAMPLE 17

The compounds of the invention were tested for their ability to inhibit the action of monoamine oxidase enzyme using the Kynuramine method described by Weissbach et al. in J. Biol. Chem. 235, 1160 (1960). Briefly this method was carried out as follows:

Partially purified monoamine oxidase was prepared by homogenizing guinea pig liver acetone powder with three volumes of distilled water. The homogenate was centrifuged at 500 r.p.m. for 3 minutes. The precipitate was discarded and the supernatant liquor was centrifuged at 4,500 r.p.m. for 20 minutes. The precipitate containing monoamine oxidase was then resuspended in an equal volume of distilled water.

Incubations were carried out in test tubes on a water bath at 30° C. using experimental tubes which contained:

|  | Ml. |
|---|---|
| Phosphate buffer (pH 7.4) | 0.3 |
| Homogenate | 0.5 |
| Test drug solution | 0.1 or 0.3 |
| Water to 2.7 ml. | |

After the tubes and contents had been preincubated for 30 minutes, the reaction was started by the addition of kynuramine dihydrobromide (0.3 ml. of 0.1 μM. solution). The disappearance of kynuramine was followed, at two minute intervals, by removing a tube from the water bath, transferring the contents to a cuvette and reading the optical density of the solution at 360 mμ. in a Unicam S.P. 500 spectrophotometer.

A blank was prepared, in which kynuramine was replaced by water. The rate of disappearance of kynuramine in the test solutions was compared with the rate of disappearance of kynuramine in controls, in which the drug solution was replaced by water.

The concentration of the drug in the incubation mixture was varied in order to discover the concentration of drug which caused 50% inhibition of monoamine oxidase.

The results obtained are shown in the following tables:

| Concentration ($10^{-6}$ mole) | Percent inhibition of monoamine oxidase | | |
|---|---|---|---|
| | A | B | C |
| 300 | 100 | 100 | 100 |
| 100 | 100 | | 100 |
| 30 | 100 | 96 | 100 |
| 10 | 100 | 87 | 100 |
| 3 | 90 | 57 | 98 |
| 1 | 86 | 37 | 94 |
| 0.3 | 52 | 4 | 60 |
| 0.1 | 25 | | 17 |

From these figures the concentration causing 50% inhibition can be determined and these figures are given below, together with the $LD_{50}$ results for each compound which were determined i.p. in mice.

| | Compound | | |
|---|---|---|---|
| | A | B | C |
| Concentration causing 50% inhibition ($10^{-6}$ mole) | 0.3 | 2 | 0.25 |
| $LD_{50}$ (mg./kg. i.p.) | 128–256 | 128–256 | 128–256 |

NOTE.—A = N-cyclopropyl-1-aminoindane hydrochloride; B = N-ethyl-N-cyclopropyl-1-aminoindane hydrochloride; C = N-cyclopropyl-5-methoxy-1-aminoindane hydrochloride.

EXAMPLE 18

In this example, the monoamine oxidiase inhibitory activity of N-cyclopropyl-1-aminoindane hydrochloride was determined in vivo using the method described generally by Woolley in Proc. Exp. Biol. Med., 18, 367 (1958). This method was carried out as follows:

Groups of 10 male Evans strain mice were given the test compounds thirty minutes prior to an injection of 5-hydroxytrytophan, 1 mg. per mouse. The numbers of mice showing tremor during the 20 minute period following the injection of 5-hydroxytryptophan were assessed subjectively. The greater the number of mice showing tremor, the greater is the monoamine oxidase inhibitory activity of the test compound.

The results obtained are given below:

| Dose mg./kg. i.p.: | No. of mice showing tremor/ No. in group |
|---|---|
| 32 | 10/10 |
| 16 | 10/10 |
| 8 | 9/10 |
| 4 | 9/10 |
| 2 | 3/10 |
| 1 | 0/10 |

The effective dose $ED_{50}$ was calculated from the above figures, using the method of Berkson in J. Biometrika., 47, 121 (1960). From this figure and the $LD_{50}$ given in Example 11, the therapeutic ratio (defined as $LD_{50}/ED_{50}$) was calculated. The results are as follows:

| $LD^{50}$, mg./kg. i.p. | $ED_{50}$, mg./kg. i.p. | Therapeutic ratio |
|---|---|---|
| 128-256 | 2.63 (95% limits) (1.88→3.66) | 35→136 |

From Examples 17 and 18, it can be seen that the compounds of this invention are active both in vitro and in vivo as monoamine oxidase inhibitors. Accordingly the compounds are likely to be useful as anti-depressants or psychostimulants when administered to animals. From the results shown for Compounds A and C in Example 17, it is apparent that the presence or absence of a methoxy substituent does not affect the activity of the compound. The methoxy substituent can therefore be said to be non-functional and accordingly it is clear that other non-functional substituents such as $R_1$ and $R_2$ defined above in Formula I can be present in the benzene ring without deleteriously affecting the monoamine oxidase inhibiting activity of the compounds of the present invention.

From the results given for Compounds A and B in Example 17, it can be seen that, although Compound B possesses useful monoamine oxidase inhibitory activity, the degree of activity is less than that of Compound A. It may be concluded therefore that the compounds of this invention on which $R_3$ in Formula I is lower alkyl will possess useful monoamine oxidase inhibitory activity but that such compounds will not be as potent as those of Formula I in which $R_3$ is hydrogen.

On examining the structures of the compounds tested in Examples 17 and 18 it is noticeable that the common factor of these compounds is the presence of an N-cyclopropyl-1-aminoindane "nucleus." Accordingly it can be concluded that this "nucleus" is essential to the possession of useful monoamine oxidase inhibitory activity. This finding has been confirmed by comparison of the activtiy of Compound A with certain homologues thereof which do not possess that "nucleus," namely N-cyclobutyl- and N-cyclohexyl-1-aminoindane. These compounds were tested by the method described in Example 18 with the following results:

| Dose, mg./kg. i.p. | Number of mice showing tremor/number in group | |
|---|---|---|
| | D | E |
| 32 | 1/10 | 0/10 |
| 16 | 0/10 | 0/10 |
| 8 | | |
| 4 | | |
| 2 | | |
| 1 | | |

NOTE.—D=N-cyclobutyl-1-aminoindane hydrochloride; E=N-cyclohexyl-1-aminoindane hydrochloride.

Compound E was inactive at 32 mg./kg. and accordingly was not tested at higher doses. Compound D, in view of its very slight activity at 32 mg./kg., was tested at 64 mg./kg. but at this dose it caused convulsive twitches before the administration of 5-hydroxy-tryptophan. In view of this side effect and its lack of activity, Compound D could clearly not be considered as a useful drug. From these results, it is apparent that the degree of monoamine oxidase inhibitory activity is not progressively increased as the size of the N-cycloalkyl ring is reduced but that, since Compound A is considerably and surprisingly active whilst Compounds D and E are inactive, the N-cyclopropyl substituent of the 1-aminoindane is an essential prerequisite of monoamine oxidase inhibitory activity.

Having regard to the foregoing disclosure, the following is claimed as the inventive and patentable embodiments thereof:

1. A pharmaceutical composition in dosage unit form adapted for administration to obtain inhibition of monoamine oxidase enzyme comprising, per dosage unit, an amount having an inhibiting effect of a compound selected from the group consisting of a compound having the formula:

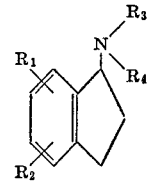

wherein $R_1$ and $R_2$ are selected from the group consisting of hydrogen, methyl, ethyl, halogen, hydroxy and lower alkoxy, $R_3$ is selected from the group consisting of hydrogen and lower alkyl, and $R_4$ is a cyclopropyl group, and a pharmaceutically acceptable acid addition salt thereof; and a pharmaceutically acceptable inert carrier.

2. A pharmaceutical composition in accordance with claim 1, comprising, per dosage unit, from 25 to 60 mg. of the compound.

3. A pharmaceutical composition in dosage unit form adapted for administration to obtain inhibition of monoamine oxidase enzyme comprising, per dosage unit, an amount having an inhibiting effect of a compound selected from the group consisting of a compound having the formula:

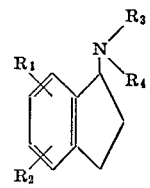

wherein $R_1$ is selected from the group consisting of 5-methoxy and hydrogen, $R_2$ is selected from the group consisting of hydrogen and 6-methoxy, $R_3$ is selected from the group consisting of hydrogen, methyl and ethyl, and $R_4$ is a cyclopropyl group, and a pharmaceutically acceptable acid addition salt thereof; and a pharmaceutically acceptable inert carrier.

4. A pharmaceutical composition in accordance with claim 3, wherein the compound is in the form of the hydrochloride salt.

5. A method of inhibiting the action of monoamine oxidase enzyme which comprises administering to an animal in a sufficient non-toxic dose a compound having the formula:

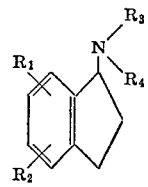

wherein $R_1$ and $R_2$ are selected from the group consisting of hydrogen, methyl, ethyl, halogen, hydroxy and lower alkoxy, $R_3$ is selected from the group consisting of hydrogen and lower alkyl, and $R_4$ is a cyclopropyl group; or a pharmaceutically acceptable acid addition salt thereof.

6. A method in accordance with claim 5, in which said compound is selected from the group consisting of N-cyclopropyl-1-aminoindane, N - methyl-N-cyclopropyl-5-methoxy-1-aminoindane, N - cyclopropyl-5,6-dimethoxy-1-aminoindane and a pharmaceutically acceptable acid addition salt thereof.

7. A method in accordance with claim 5, in which said compound is N-cyclopropyl-1-aminoindane hydrochloride.

8. A method in accordance with claim 5 in which $R_1$ and $R_2$ are selected from the group consisting of hydrogen and lower alkoxy, and $R_3$ is selected from the group consisting of hydrogen and lower alkyl.

9. A method in accordance with claim 5 wherein $R_1$ and $R_2$ are selected from the group consisting of hydrogen and methoxy and $R_3$ is selected from the group consisting of hydrogen, methyl and ethyl.

10. A method in accordance with claim 5 where $R_3$ is hydrogen, $R_1$ is 5-methoxy, and $R_2$ is selected from the group consisting of hydrogen and 6-methoxy.

11. A method in accordance with claim 5 wherein $R_1$ and $R_2$ are hydrogen and $R_3$ is selected from the group consisting of hydrogen, methyl and ethyl.

References Cited

UNITED STATES PATENTS 2,977,308  3/1961  Miller et al. _____ 260—576

STANLEY J. FRIEDMAN, Primary Examiner

U.S. Cl. X.R.

424—266